April 18, 1944.   E. E. GREEN   2,347,049
STRUCTURAL JOINT
Filed Aug. 19, 1942
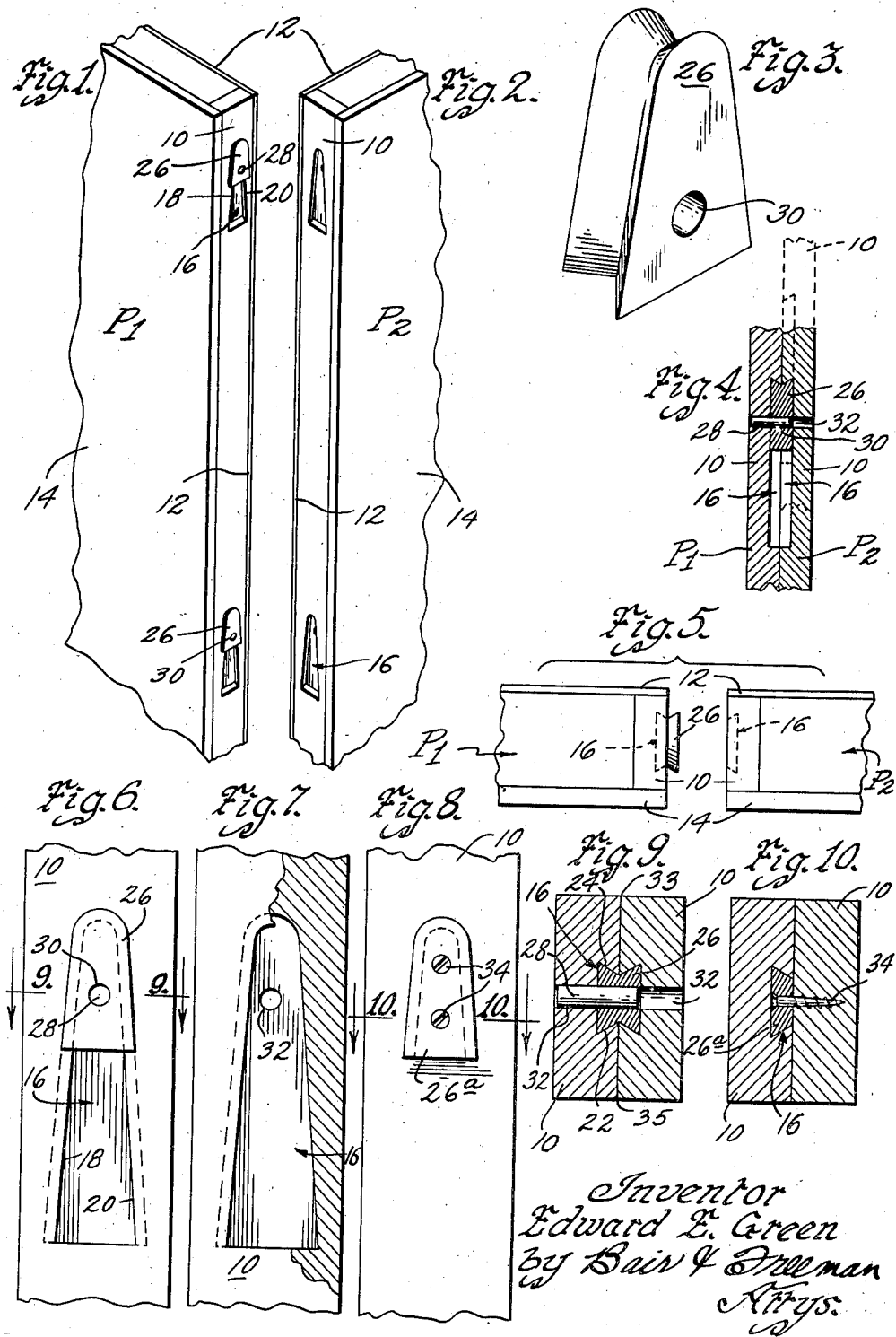

Patented Apr. 18, 1944

2,347,049

UNITED STATES PATENT OFFICE 2,347,049

STRUCTURAL JOINT

Edward E. Green, Clinton, Iowa, assignor to Curtis Companies Incorporated, Clinton, Iowa, a corporation of Iowa Application August 19, 1942, Serial No. 455,297

2 Claims. (Cl. 20—92)

My invention relates to a joint useful in the assembly of various kinds of structures. It has application, for example, in connecting adjacent edges of panels, such as those used in the assembly of prefabricated houses.

An object of my invention is to provide a structural joint the elements of which may be arranged in the edges of panel members so that any two adjacent edges of such panels can always be fitted together.

A further object is to provide a joint structure such that both edges of a structural panel may be manufactured in the same form, so that no "rights" or "lefts" need to be considered in manufacture, stocking or assembly.

Still another object is to provide a joining means consisting of recesses in the structural members, and a key adapted to fit into the recesses, so arranged that the key may be applied in either one of the adjacent panels, as may be most convenient at the time of erection.

An additional object is to provide a joint structure which will tend to align the faces of adjacent panels, as well as to pull the panels together.

Another object is the provision of a key and recess type of interlocking joint in which the key develops the full strength of its material.

Further objects are the provision of a joining means which will enable the joined structural members to be disassembled and salvaged without waste when this is desired; which will permit the assembly of structural members or panels without the use of nails, screws or bolts; and which will facilitate the construction of enclosures having no magnetic materials, where this is required to eliminate magnetic disturbances.

With these and other objects in view, my invention consists in the construction, arrangement and combination of the various parts of my structural joint whereby the objects contemplated are attained, as hereinafter more fully set forth, pointed out in my claims, and illustrated in the accompanying drawing, in which:

Figure 1 is a perspective view of a structural panel provided with the joining means which I have invented;

Figure 2 is a perspective view of a panel carrying the complementary parts of the joint;

Figure 3 is an enlarged perspective view of the key member which forms a part of my structure;

Figure 4 is a vertical sectional view of the parts as assembled, portions being shown as broken away and dotted lines indicating a preassembly position;

Figure 5 is a top view illustrating the relation of the parts in my structure;

Figure 6 is an elevational view, on an enlarged scale, of a portion of my joint structure, as illustrated in Figure 1;

Figure 7 is an elevational view, partly in section, of that part of my joint structure shown in Figure 2;

Figure 8 is an elevational view, corresponding generally to Figure 6, but showing a modified form in which my invention may be embodied;

Figure 9 is a horizontal sectional view taken on the line 9—9 of Figure 6, with the complementary member of Figure 7 in assembled relation, and Figure 10 is a horizontal sectional view taken as on the line 10—10 of Figure 8, with the addition of the complementary member which is not shown in Figure 8.

The preferred form of my invention is illustrated in Figures 1–7 and 9. In Figures 1 and 2, I have shown my structure as applied to panels P1 and P2 of a type used in prefabricated housing construction. It will be apparent, however, that this type of joint has other applications, and the showing of it as used on panels is merely illustrative.

The type of panel shown consists of a studding member 10 (which may be a standard 2 x 4), an outside finish panel 12, and an inside wall finish panel 14. Insulating material may be provided between these finish panels as desired. As will be observed in Figure 1, the edge of the panel P1 is constituted by what may be called the face of the studding member 10. In this face I form what may be most conveniently described as a tapered dovetail recess. By tapered, I refer to the fact that the width of the opening, transversely of the face of the studding member 10, varies uniformly along the length of this studding member. By dovetail, I refer to the fact that the recess is undercut on a bevel. The recess I indicate generally as 16. The taper is illustrated in the drawing by the divergence of the sides 18 and 20 in the aspect seen, for example, in Figure 6. The dovetail is illustrated particularly in Figure 9 by the divergence of the surfaces 22 and 24, as viewed in the cross-section.

Several such recesses 16 are formed in each edge of the panels which are ultimately to be assembled in adjacent relation. In the drawing, I have shown two recesses in the panel P1 and two recesses correspondingly placed in the panel P2.

The actual tying together of two adjacent panels is accomplished through the medium of a member 26, which I call a key. It is a tapered double dovetail element which ordinarily may be formed of hardwood, although the characteristics of the members to be joined will often determine the preferable material. The relative lengths of the key member 26 and the recesses 16 are made such that the key member can be slipped into the recess at its wide portion, yet will wedge firmly into the recess before it quite reaches the small end. When it is desired to assemble the panels P₁ and P₂, keys 26 are placed in the recesses in one of the panels, and tapped firmly into place at the small end of the recesses.

In the drawing, I have shown the keys as applied in the recesses on the panel P₁. When the keys are wedged into the small ends of the recesses 16, dowel members 28 are passed through holes 30 in the keys and holes 32 in the corresponding members 10. The holes may be made during the manufacturing operation, in which case only one of the holes 32 is used, as may be seen in Figures 4 and 9. Or the holes may be drilled on the job, after the key has been shoved home, and in this case only the key and one member 10 need be drilled. It will be seen that insertion of the dowel locks the key into position at the small end of the recess 16. When the keys have been fastened in place, the panel P₁ appears as shown in Figure 1. The adjacent panel P₂ can then be moved into close relation with it, raised slightly to permit the keys to enter the recesses in P₂, and then dropped over the keys. When panel P₂ is thus moved downwardly, the coaction of the key 26 and the recesses 16 into which it fits is such as to pull the adjacent panels tightly together. Furthermore, it will be noted that when the recesses are carefully formed on the center lines of the members 10, the tapered form of the recesses will cause the panels to be brought into accurate alignment on their faces, as indicated at the points 33 and 35 in Figure 9.

Figure 4 shows in dotted lines the position of the member 10 on the panel P₂ after it has been brought into position so that the projecting portion of the key 26 extends into the wider part of the recess 12 in the panel P₂. When the panel P₂ is moved downwardly, the parts assume the position shown in full lines in Figure 4.

It should be noted that with my construction, the same type of recess 16 is formed in each of the two meeting edges of the panels. Thus, the manufacturing machine work can be exactly the same on each side and there is no trouble with "rights" and "lefts," either in manufacture or in assembly. Any two panels of the same type can be readily fastened together, and so far as the joining elements are concerned, the panels can be reversible. The double dovetail keys may be fastened into either panel, as may be best at the time of assembly, according to whether it may be more convenient to lift one or the other of the panels into place for purposes of assembly.

If it be desired to disassemble the panels, it is only necessary to reverse the process, lifting P₂ from P₁. No damage to or disfigurement of the panels need result, and there is therefore no waste in salvaging the panels for reuse.

Furthermore, so far as the joint itself is concerned, no nails or screws need be used, and it is thus entirely possible to construct a building without nails or other magnetic material which would cause magnetic disturbances. This is sometimes of importance when certain types of electrical or radio measurements are to be made.

Note that the dovetail undercut is carried around the small end of the recess, as indicated in Figures 4 and 7. The key 26 has a corresponding bevel carried around its small end, thus increasing the bearing surface of the interlocking parts.

A modified form of my device is shown in Figures 8 and 10. This consists essentially of a key member applied to the plain surface of one of the studding members 10 by screws or other suitable fastening means. The key itself is designated as 26a, and is preferably formed substantially like a half of the member 26 illustrated in Figure 3. The key 26a is fastened to the studding by screws 34 and engages, in the edge face of the coacting panel, a tapered dovetail recess 16, which may be the same in every respect as those previously described. The form just described does not have all the advantages of the preferred form, because its strength is limited to a considerable extent by the holding power of the threads of the screw 34, and, furthermore, the Figures 8–10 form is not so universal in use since it requires that the panels be constructed with recesses on one edge and keys on the opposite edge, so that they cannot be reversible. Rights and lefts must be watched on the erection job. Nevertheless, the fact that it requires only half as many recesses 16 may make it somewhat more economical in manufacture, and it has many of the advantages of the preferred construction.

In the preferred form, however, there is no fastening means with screw threads limiting the force which may be safely applied. The double dovetail key 26 will develop the full strength of its material, because its form, as previously described, gives ample bearing surface in the interlocking portions.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a structural joint, a pair of members adapted to be assembled in face-to-face relation, having tapered dovetail recesses formed in their adjacent faces spaced from all surrounding corner edges, the dovetail extending along the sides and across the small end of each recess, a tapered dovetail key inter-fitting with said recesses, adapted to enter the recess near one end and to seat snugly in the other end, and means for fastening the key to one member in its seated position without interfering with the assembling of the other member.

2. In a structural joint, a pair of members adapted to be assembled in face-to-face relation, having tapered dovetail recesses formed in their adjacent faces, the dovetail extending along the sides and across the small end of each recess, a tapered dovetail key inter-fitting with said recesses, adapted to enter the recess near one end and to seat snugly in the other end, and means for fastening the key to one member in its seated position without interfering with the assembling of the other member.

EDWARD E. GREEN.